Dec. 13, 1949    A. G. FORSYTH    2,491,172
ELECTRICAL EQUIPMENT ON AIRCRAFT
Filed Nov. 23, 1945    5 Sheets-Sheet 1
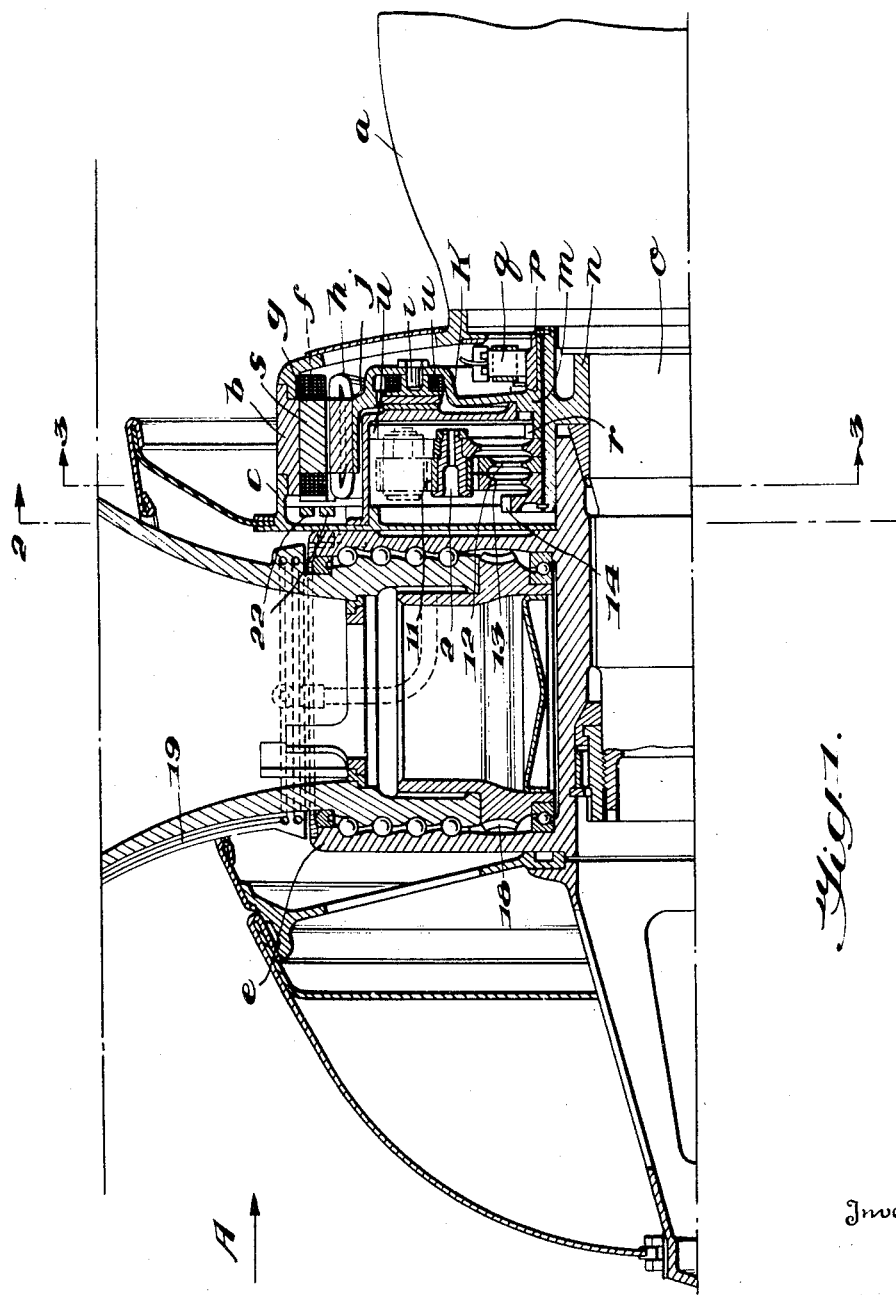

Dec. 13, 1949  A. G. FORSYTH  2,491,172
ELECTRICAL EQUIPMENT ON AIRCRAFT
Filed Nov. 23, 1945  5 Sheets-Sheet 2
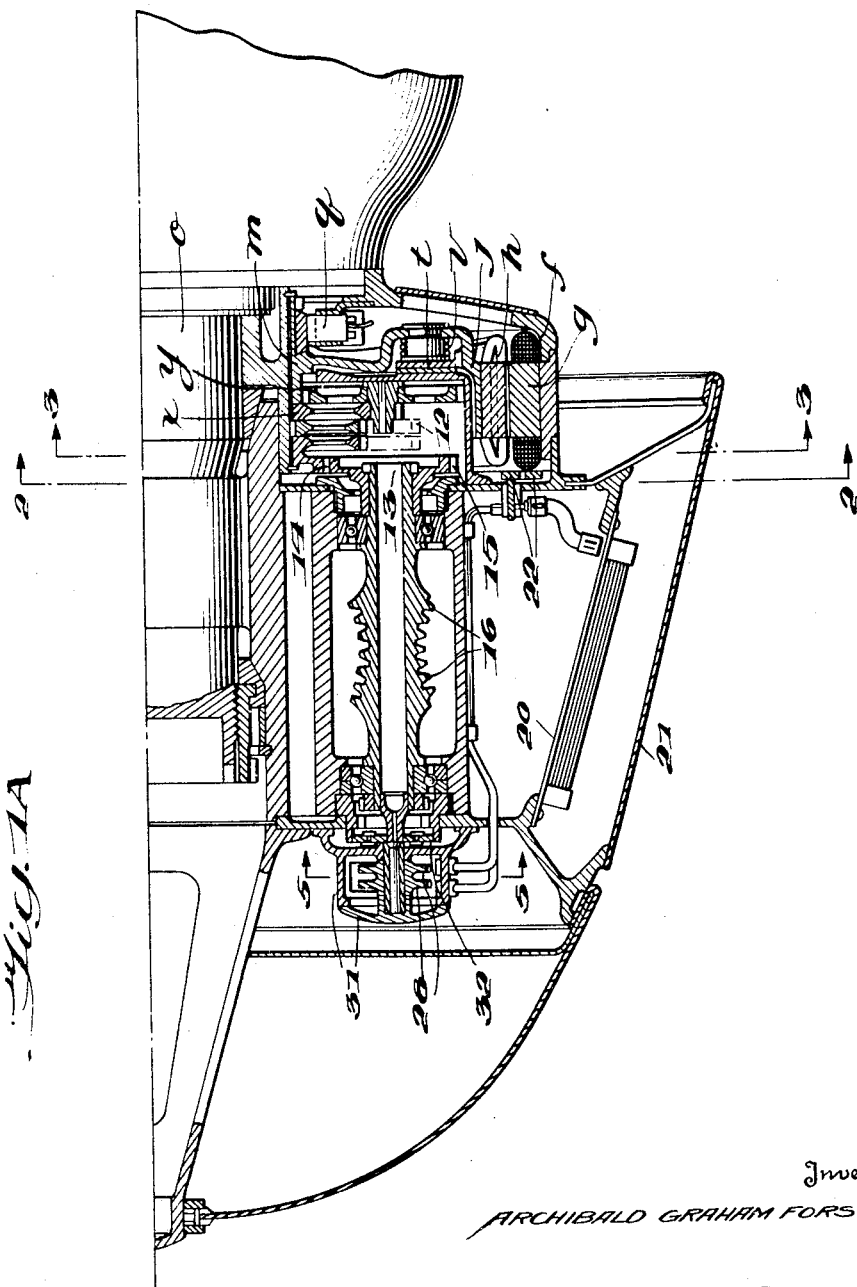
Inventor
ARCHIBALD GRAHAM FORSYTH,
By Robert B. Larson
ATTORNEY

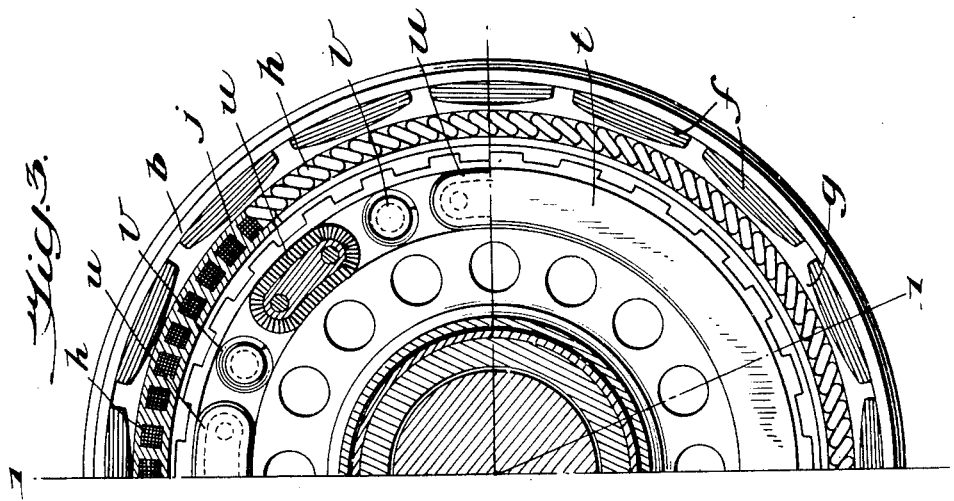
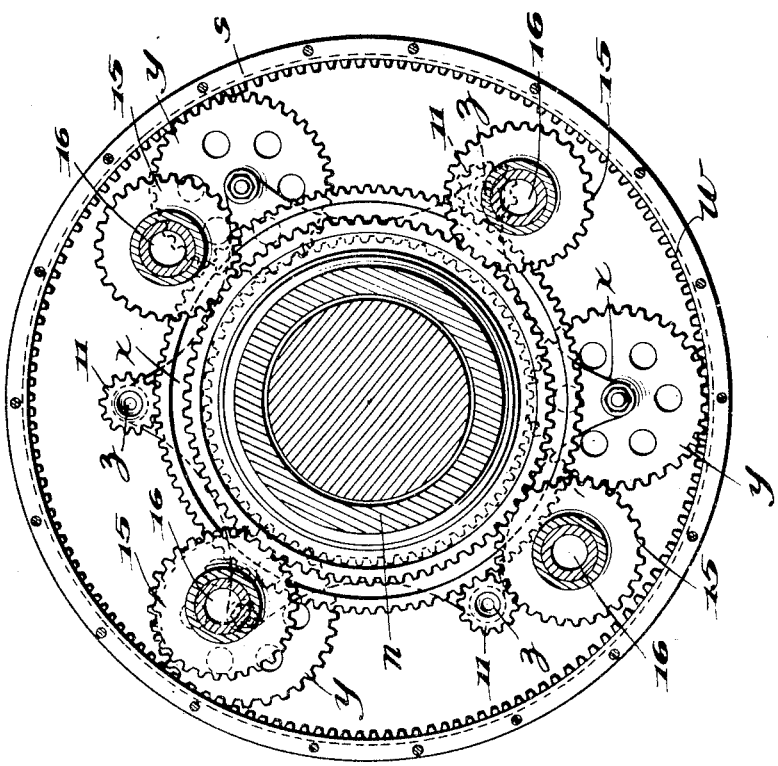

Dec. 13, 1949 A. G. FORSYTH 2,491,172
ELECTRICAL EQUIPMENT ON AIRCRAFT
Filed Nov. 23, 1945 5 Sheets-Sheet 4
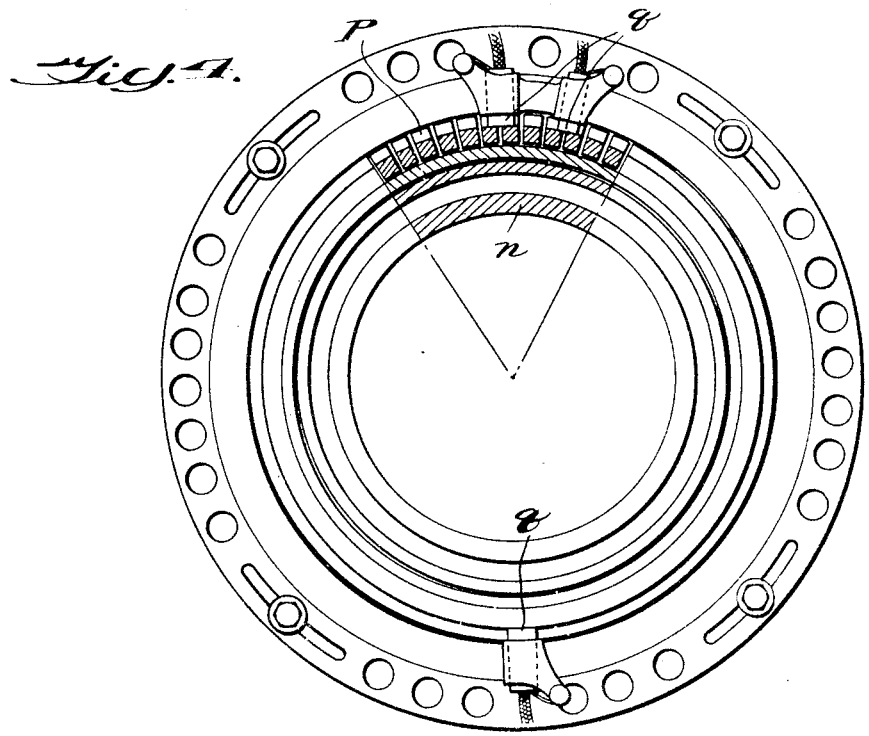
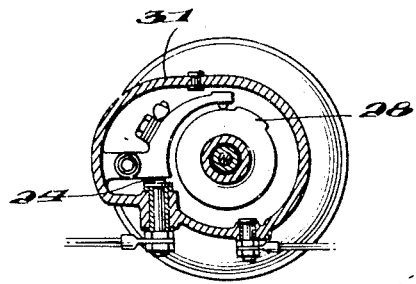
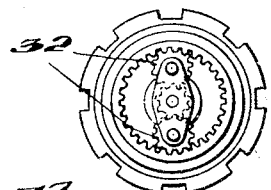
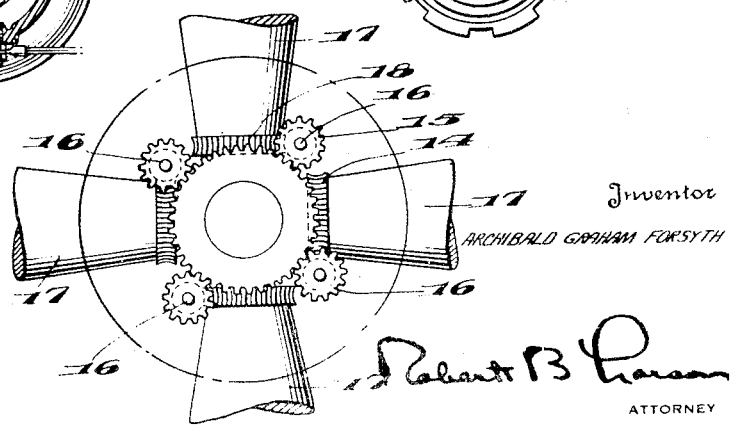
Inventor
ARCHIBALD GRAHAM FORSYTH
ATTORNEY

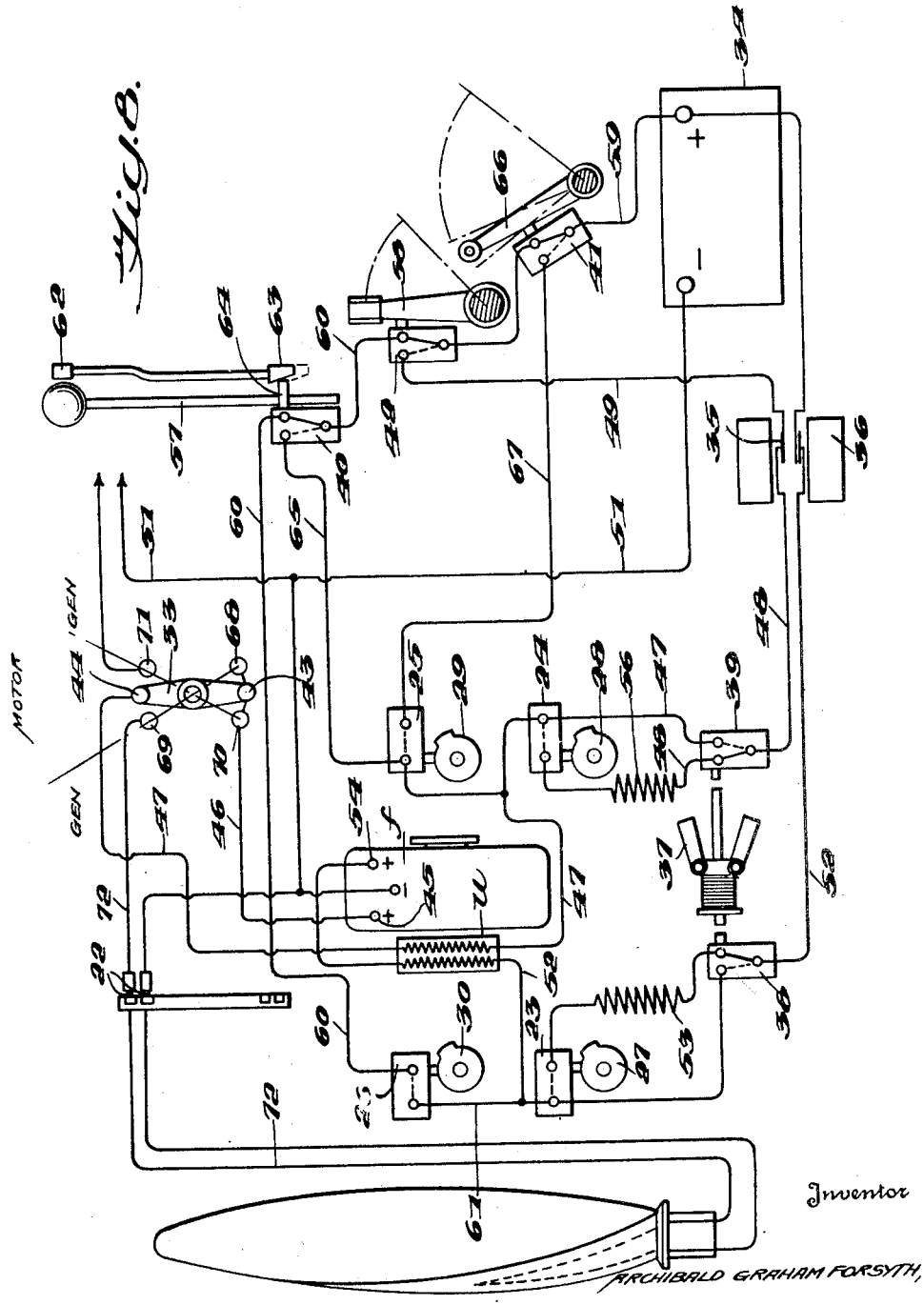

Patented Dec. 13, 1949

2,491,172

UNITED STATES PATENT OFFICE 2,491,172

ELECTRICAL EQUIPMENT ON AIRCRAFT

Archibald Graham Forsyth, Cheam, England, assignor to The Fairey Aviation Company Limited, Hayes, England Application November 23, 1945, Serial No. 630,407
In Great Britain May 7, 1945

5 Claims. (Cl. 170—160.18)

1

This invention relates to electrical equipment on aircraft and has for its object a self contained electrical unit for association with a variable pitch propeller to provide means for varying the pitch of the propeller blades, and to generate current for electrical de-icing devices for the blades and spinner of such a propeller and for heating, lighting and other purposes on the aircraft.

To this end and according to the present invention the field coils and brush gear of a dynamo electric machine are mounted on the nose of the engine, the armature of the machine is arranged to be freely rotatable about the propeller shaft and a magnetic clutch is arranged to clutch the armature to the propeller hub so as to rotate as one therewith or to serve as a brake when the machine is used as a motor for pitch changing purposes.

Preferably the armature is carried by a spider, and sun and planet gearing for pitch changing purposes is arranged within a casing extending rearwardly from, and coaxially with, the propeller hub, the magnetic clutch being arranged between said spider and casing and the spider having a toothed sleeve extending coaxially into the casing to serve as a sun wheel for operation of the sun and planet gear therein.

The pitch changing mechanism may comprise, for each blade, a worm wheel around the root of the blade, and a worm on a shaft tangential to said blade root, said shaft having a gear wheel at one end. The gearing for driving the pitch changing mechanism may comprise a spider carrying planet wheels meshing with the sun wheel on the armature carrying spider and also with internal teeth in the gear casing, planet wheels freely rotatable on spindles carried by the planet-wheel-carrying spider and meshing with a fixed sun wheel and with a freely rotatable sun wheel, side by side therewith, which has more teeth than the fixed sun wheel and has an extension carrying a gear wheel meshing with the gear wheels on the pitch-changing worm shafts.

In the accompanying drawings Figures 1 and 1A are a sectional elevation on the line 1—1 of Figure 3 and illustrating a propeller hub constructed according to one form of the invention; Figure 2 is an end elevation of the gear box thereof, detached from the remainder and viewed from the plane indicated by the line 2—2, Figures 1 and 1A; Figure 3 is a half end sectional elevation of the dynamo electric machine thereof, detached from the remainder and viewed from the plane indicated by the line 3—3, Fig-

2 ures 1 and 1A, the clutch plate being from the upper half of the figure and parts being shown in section as set out hereinafter; Figure 4 is a sectional end elevation of the brush gear, a part of the commutator being shown in section; Figures 5 and 6 are detail sections on the lines 5—5, and 6—6, Figures 1 and 1A respectively; Figure 7 is a front elevation of the propeller, on a reduced scale; and Figure 8 is a wiring diagram.

As illustrated there is secured coaxially on the nose $a$ of the engine (not shown) a cylindrical casing $b$ of small axial length, open at its front end and arranged to fit freely into a coaxial flange $c$ projecting rearwardly from a plate $d$ forming part of the propeller hub $e$. At the inner periphery of the casing $b$ the field coils $f$ . . . of a dynamo electric machine are wound on cores $g$. The armature $h$ of the dynamoelectric machine is wound on the peripheral flange $j$ of a substantially L-section spider $k$ which is carried by a sleeve $m$, the spider $k$ and sleeve $m$ constituting a rotor rotatable on a central base $n$ fast on the propeller shaft $o$. The armature $h$ and flange $j$ are shown in section in the upper part of Figure 3. The sleeve $m$ of the armature carrying rotor extends rearwardly and forwardly from the spider $k$ and has mounted on its rearward extension a commutator $p$ to co-operate with brushes $q$ . . . carried by the wall at the rear end of the cylindrical casing $b$, while its forward extension is formed as a sun wheel $r$.

Mounted at the rear of the propeller hub $o$ is a cylindrical gear casing $s$ which rotates as one with said hub, and which projects rearwardly into the annulus presented by the L-section spider $j$, $k$ and between the rear end of this gear casing and said L-section spider is arranged a magnetic clutch $t$, $u$ the face plate $t$ being shown in end view in the lower part of Figure 3. In the upper part of Figure 3 one coil $u$ of the magnetic clutch is shown in section and the halves of two other coils are shown in end elevation, the face plate $t$ being removed, so that, when required, the armature $h$ may be caused to rotate as one with the casing $s$. The face plate $t$ of the magnetic clutch is splined in a recess in the spider $k$ and is urged towards its free position by springs as at $v$. By the free position of plate $t$ is meant the position to which plate $t$ is urged by springs $v$ when coils $u$ of the clutch are deenergized.

In the operation of the magnetic clutch, the springs $v$ ordinarily maintain the clutch parts engaged so that spider $k$ rotates with casing $s$. When the coils $u$ of the clutch are energized, the face plate $t$ of the clutch is moved against springs v out of engagement with the facing at the end of casing s so that the spider k carrying the armature h is disengaged from casing s and is rotatable with respect to casing s. It should be noted in the wiring diagram of Fig. 8 that the clutch coils are energized every time the coils f of the dynamo electric machine are energized to cause changes in pitch. Breaking of the circuit to coils f on the other hand causes deenergization of clutch coils u.

The forward extension of the sleeve m of the armature carrying rotor projects into the gear casing s and at its inner periphery the gear casing is formed with internal teeth w. Within the gear casing s and freely rotatable on the central base n is a spider x having, at its rear side, planet wheels y . . . which mesh with the sun wheel r on the forward extension of the sleeve m the armature carrying rotor and with the internal teeth w on the gear casing s, while, at its front side, the planet wheel carrying spider x has forwardly projecting spindles z . . . on which are rotatable planet pinions 11, the teeth of which are wide enough to mesh with two sun wheels 12, 13, arranged side by side. One, 12, of these two sun wheels is keyed to the central base n and the other, 13, is freely rotatable thereon, has three more teeth than the fixed sun wheel 12, although the teeth of both sun wheels 12, 13 are cut on the same pitch circle, and has a forward projection formed with external teeth 14 with which mesh gear wheels 15 . . . on worm shafts 16 . . . which extend tangentially with respect to the roots of the propeller blades 17 . . . , the roots of said blades having worm wheels such as 18 formed therearound.

For de-icing purposes heating elements such as 19 are arranged at the leading edges of the propeller blades 17 and such as 20 in the spinner 21 of the propeller and current is transferred from slip rings 22, 22, disposed in the casing b of the dynamoelectric machine, the slip rings 22, 22 being rotated with the propeller and the connections with the heating elements in said blades being flexible.

The electric controls, include, as shown in Figure 8, a fine pitch limit switch 23, a coarse pitch limit switch 24, a feathering pitch limit switch 25, and a reverse pitch limit switch 26, operated by cams 27, 28, 29 and 30 respectively. Only two of these cams viz. 27 and 28 are shown in Figures 1 and 1A, the two others viz. 29 and 30 and the switches 25 and 26 operated thereby are situated diametrically opposite thereto with respect to the axis of rotation of the propeller shaft o. Each pair of switches 23, 24 and 25, 26, and their respective cams 27, 28 and 29, 30 are mounted as at casing 31 and operated by the pitch changing worm shafts 16 . . . through epicyclic gearing as at 32, Figure 6. These electric controls are such that the armature h may be clutched to the gear casing s and propeller hub e so as to rotate as one therewith for generating purposes, during which the gearing in the casing s remains static and the current generated may be employed for lighting, heating and other purposes including, when required, heating for de-icing the propeller blades 17 . . . and spinner 21, a change-over switch 33 (Figure 8) being operated when current is required for that purpose. Alternatively, for pitch changing purposes, the dynamo electric machine may have current supplied thereto to act as a reversible motor, the magnetic clutch t, u, being released but usable as a brake. In this event, the angular displacement of the armature h relatively to the gear casing s causes the sun wheel r carried by the forward extension of the sleeve m of the armature carrying rotor j, k to rotate the planet wheels y . . . meshing therewith which, rolling on the internal teeth w in the gear casing s cause the planet wheel carrying spider x to turn relatively to the casing s thus causing the planet pinions 11 carried by said spider to roll around the relatively fixed sun wheel 12 with which they mesh. As the sun wheel 13 with which said planet pinions 11 mesh has thereon three more teeth than the fixed sun wheel 12 it follows that said sun wheel 11 is rotated relatively to the sun wheel 12, i. e. the relative positions of the two sun wheels 11, 12 change by the angular extent of three teeth per revolution of the planet wheel carrying spider x. This brings about rotation of the gear wheel 14 on the extension of the sun wheel 13 and rotation of the gear wheels 15 . . . on the pitch changing worm shafts 16 . . ., such rotation being controlled by the pitch limit switches. Rotation of shafts 16 causes the worm gearing of the shafts to rotate the propeller blades by means of worm wheels 18 carried by the blade roots.

From the preceding disclosure it will be clear that relative rotation between spider k (carrying armature h) and casing s causes pitch changing movement of the propeller blades. Since the dynamoelectric machine comprising field coils f and armature h operates as a reversible motor during pitch changing, the armature is rotated in either direction of rotation to cause movement of the blades in the direction of finer or coarser pitch, depending upon the direction of rotation of the armature. However, it is necessary when the desired pitch is reached that the relative rotation between the armature and casing s be quickly terminated. By deenergizing the clutch u when such termination is desired, plate t of the clutch is permitted to engage casing s under the urging of springs v. The armature is thus quickly brought to the same direction and speed of rotation as casing s and when armature h is thus caused to rotate with casing s, the pitch changing movement of the blades ceases due to the termination of the relative movement between the casing s and the armature.

The field windings f of the dynamoelectric machine are subdivided so that the whole may be used for generating purposes or when maximum power is required for motoring purposes, but, when the machine is used for pitch changing with constant speed governing, only a part of the field need be employed thus reducing current consumption.

When the machine is to be used as a motor, current may be supplied thereto from accumulators but, in the case of a multi-propeller aircraft, switch mechanism may be provided to enable the output from the dynamoelectric machines associated with the engines of some of the propellers to be fed to the dynamoelectric machines associated with the engines of other propellers so that they may be used as motors for pitch changing purposes.

The design is such that the propeller can be removed from the engine without disturbing the gearing.

Figure 8 shows diagrammatically a circuit diagram which can be employed with the apparatus described. In Figure 8 34 indicates a 24 volt battery adapted under predetermined conditions, and when the magnetic clutch t, u is disengaged, to energize the dynamoelectric machine f, h, Figures 1 and 1A, as a reversible electric motor to actuate the pitch changing mechanism mechanically as described above, to fine and to coarse pitch, depending on the direction of operation of the motor.

A main governor is provided with a coarse pitch switch 35 and a fine pitch switch 36 and an auxiliary governor 37 is arranged to actuate two switches 38 and 39, the purpose of which will be described shortly.

The circuit includes as well as the fine pitch limit switch 23, the coarse pitch limit switch 24, the feathering pitch limit switch 25, and the reverse pitch limit switch 26, a fine pitch switch 40, a feathering switch 41 and a reverse pitch switch 42. The main governor with its switches 35, 36 may be of any known type as will operate in accordance with the speed of the aircraft engine.

The operation of the circuit will now be described.

When the change over switch 33 is in the position shown in Figure 8, it bridges a pair of contacts 43 and 44 in order that the dynamoelectric machine f, h, Figure 1, (indicated in Figure 8 by the reference letter f only), may be used to charge the battery 34. For this operation the auxiliary governor will have moved the switch 39 to the position shown by a broken line and the coarse pitch switch 35 of the main governor will be closed. The contact 43 of the switch 33 is connected with a positive terminal 45 of the dynamo electric machine by a lead 46 and the contact 44 is connected, by a lead 47, via the winding u of the magnetic clutch t, u, the switch 39, a lead 48, the switch 35 of the main governor, a lead 49, via the switches 42 and 41 and a lead 59 with the positive terminal of the battery 34, the negative terminal of said battery being connected by a lead 51 with the negative terminal of the dynamoelectric machine.

Under normal flight conditions the main governor will maintain the speed of the aircraft engine substantially constant over the governed range. If the speed of the engine increases or decreases the fine pitch switch 36 or the coarse pitch switch 35 will be closed, thus effecting the pitch change necessary to restore the engine speed to normal. This is due to the fact that when the main governor closes either coarse pitch switch 35 or fine pitch switch 36, the coils f of the dynamoelectric machine will be energized in one polarity or an opposite polarity to cause the armature to rotate in a corresponding direction relative to the casing s and thereby bring about pitch changes in the manner described above.

It will be noted that a lead 52 from the fine pitch switch 36 of the main governor extends through the switch 38 of the auxiliary governor 37, thence through a resistance 53 to the fine pitch limit switch 23 and through that switch and coils u of the magnetic clutch to a positive terminal 54 of the dynamoelectric machine f. Similarly, the lead 48 from the coarse pitch switch 35 of the main governor extends through the switch 39, of the auxiliary governor 37, thence through a resistance 56, through the coarse pitch limit switch 24, and by way of the lead 47 to coils u of the magnetic clutch, the contact 44 of the switch 33 and by the lead 46 to the terminal 45 of the dynamoelectric machine f. The resistances 53 and 56 are such that when the circuit passes through them the machine f is energized as a motor by current at 12 volts.

In the event that the pilot suddenly decreases or increases the engine speed, the auxiliary governor 37 will operate either the switch 38 or the switch 39, so that the particular resistance 53 or 56 is cut out and the machine f is energized by current at 24 volts, thus effecting a much more rapid pitch change to fine or coarse pitch, as the case may be. It can be appreciated that the auxiliary governor 37 thus prevents "over-reving" or "under-reving" of the engine upon sudden changes of speed by doubling the rate of pitch change to fine or coarse.

Assuming that the pilot desires to go into a dive, the main control lever 57 is pulled rearwardly, pulling rearwardly with it a lever 58 (which may be connected mechanically with the lever 57 in a manner which does not form part of the present invention, but which is disclosed in the specification of application for Letters Patent Serial No. 567,990, filed December 13, 1944), to the right, Figure 8. In doing so the lever 58 leaves the reverse pitch switch 42 which snaps over to complete a circuit through a lead 59 from the positive terminal of the battery 34, the feathering switch 41, the reverse pitch switch 42, a lead 60, through the fine pitch switch 40, the reverse pitch limit switch 26, a lead 61 and the lead 62, coils of the magnetic clutch u to the positive terminal 54 of the machine f and back from the negative terminal of that machine and the lead 51 to the negative terminal of the battery 34, thus effecting a change to reverse pitch by rotating armature h relative to casing s by energization of field coils f.

Similar conditions pertain to "landing" when reverse pitch is used for braking. In both these conditions, the amount of reverse pitch to be used for driving or braking, and the proper throttle limit for such reverse pitch can be set by the pilot in advance by means disclosed in the copending application referred to above.

Assuming that the pilot has misjudged the landing and desires quickly to rise and circle the field again, instinctively he will push the main control lever 57 forwardly, but the propeller is still in reverse pitch and such a condition for safety requires an immediate change to fine pitch. If the main control lever 57 could be pushed forwardly while the propeller is in reverse pitch, a crash would undoubtedly result, to prevent which, in order to allow the main control lever 57 to be pushed forwardly, to neutral or gate position, the pilot must first depress an operating button 62. This releases a pawl from a ratchet (neither of which is shown) and at the same time a cam 63 acts on a plunger 64 and moves the fine pitch switch 40 to the position shown by a broken line thus changing the circuit from the positive terminal of the battery 34, lead 59, feathering switch 41, reverse pitch switch 42, and lead 60 to a lead 65, through the feathering pitch limit switch 25, lead 47, coils u of the magnetic clutch, contact 44, switch 33, lead 46 to the positive terminal 45 of the machine f and back from the negative terminal of that machine by the lead 51 to the negative terminal of the battery 34. Hence, by the time the main control lever 57 is back to neutral position, the propeller is in fine pitch. Then by pushing the main control lever 57 forwardly full throttle can be applied for a quick rise.

66 is an auxiliary lever for actuating the feathering switch 41 to establish a circuit for effecting feathering pitch by connecting the positive terminal of the battery 34 with a lead 67 to the feathering pitch limit switch 25, lead 47, coils u of the magnetic clutch, contact 44, switch 33, lead 46 to the positive terminal 45 of the machine f and back from the negative terminal of that machine by the lead 51 to the negative terminal of the battery 34. The auxiliary lever 66 is also used for adjusting the stresses on the springs of both the main and auxiliary governors as set out in the co-pending patent application referred to above.

The switch 33 also includes two further pairs of contacts 68, 69 and 70, 71 of which the contacts 68 and 70 are connected by the lead 45 with the positive terminal 45 of the machine *f*, the terminal 69 is connected by a lead 72, through a slip ring 22 with the heating units 19 of the blades 17 and 20 of the spinner and thence back to the negative terminal of the machine *f*, while the terminal 71 is connected by a lead 73 with electrical apparatus (not shown) in the aircraft, the return circuit being by way of the lead 51 to the negative terminal of the battery 34. Hence, by altering the position of the switch 33 current generated by the machine *f* may be used for de-icing purposes and for heating, lighting and other purposes on the aircraft as well as for pitch changing and battery charging purposes.

I claim:

1. An aircraft propulsion arrangement having a propeller shaft and a propeller hub, a dynamoelectric machine having its field coils and brush gear mounted on the front end of the engine, and having its armature freely rotatable about the propeller shaft, a spider carrying said armature, a gearing casing rotatable with the propeller hub and extending rearwardly from and coaxial with the propeller hub, a magnetic clutch between the spider and the casing and operable to clutch the armature to said casing for rotation as one with the propeller hub, sun and planet gearing means within said casing operably connected to the propeller for pitch changing purposes, a toothed sleeve fixed to said spider and extending coaxially into the casing into engagement with said sun and planet gearing therein to serve as a sun wheel for operation of the sun and planet gearing, an electrical control circuit for operating said dynamoelectric machine as a motor, and switch means causing said clutch to serve as a brake to terminate actuation of said gearing means and pitch changing movement of the propeller when said dynamoelectric machine is used as a motor.

2. An aircraft propulsion arrangement, as claimed in claim 1, and having pitch changing mechanism including, for each blade, a worm wheel around the root of the blade, a shaft tangential to the blade root, a worm on said shaft engaging said worm wheel, a gear wheel at one end of said shaft, said sun and planet gearing for driving the pitch changing mechanism comprising a spider, a first set of planet wheels carried by said spider and meshing with the sun wheel on the armature carrying spider, internal teeth in the gear casing meshing with said first planet wheels, a second set of planet wheels, spindles carried by the planet-wheel-carrying spider and supporting said second planet wheels for free rotation, a fixed sun wheel and a freely rotatable sun wheel mounted side by side in mesh with said second planet wheels, said freely rotatable sun wheel having more teeth than the fixed sun wheel and having an extension, and a gear wheel carried by said extension and meshing with the gear wheels on the pitch-changing worm shafts.

3. An aircraft propulsion arrangement, as claimed in claim 1, and having pitch changing mechanism including, for each blade, a worm wheel around the root of the blade, a shaft tangential to the blade root, a worm on said shaft engaging said worm wheel, a gear wheel at one end of said shaft, said sun and planet gearing for driving the pitch changing mechanism comprising a spider, a first set of planet wheels carried by said spider and meshing with the sun wheel on the armature carrying spider, internal teeth in the gear casing meshing with said first planet wheels for free rotation, a fixed sun wheel and a freely rotatable sun wheel mounted side by side in mesh with said second planet wheels, said freely rotatable sun wheel having more teeth than the fixed sun wheel and having an extension, and a gear wheel carried by said extension and meshing with the gear wheels on the pitch-changing worm shafts, fine and coarse pitch limit switches, a feathering pitch limit switch and a reverse pitch limit switch controlling operation of said clutch when said clutch is used as a brake, epicyclic gearing driven by some of said worm shafts, and cams operating said limit switches and driven by said epicyclic gearing.

4. An aircraft propulsion arrangement, as claimed in claim 1, and having pitch changing mechanism including, for each blade, a worm wheel around the root of the blade, a shaft tangential to the blade root, a worm on said shaft engaging said worm wheel, a gear wheel at one end of said shaft, said sun and planet gearing for driving the pitch changing mechanism comprising a spider, a first set of planet wheels carried by said spider and meshing with the sun wheel on the armature carrying spider, internal teeth in the gear casing meshing with said first planet wheels for free rotation, a fixed sun wheel and a freely rotatable sun wheel mounted side by side in mesh with said second planet wheels, said freely rotatable sun wheel having more teeth than the fixed sun wheel and having an extension, and a gear wheel carried by said extension and meshing with the gear wheels on the pitch-changing worm shafts, fine and coarse pitch limit switches, a feathering pitch limit switch and a reverse pitch limit switch controlling operation of said clutch when said clutch is used as a brake, epicyclic gearing driven by some of said worm shafts, and cams operating said limit switches and driven by said epicyclic gearing, electrical resistances in said control circuit, switches for by-passing said resistances, and an auxiliary governor for actuating said by-pass switches to cut out the resistances from the pitch changing circuits when rapid pitch changing is required.

5. An aircraft propulsion arrangement as claimed in claim 1, other electrical devices including propeller blade and spinner de-icing means and a battery all connectable to said dynamo electric machine, and a change over switch for directing current generated by said dynamoelectric machine to said electrical devices or alternatively to connect said dynamoelectric machine as a motor for pitch changing purposes.

ARCHIBALD GRAHAM FORSYTH.

REFERENCES CITED

The following references are of record in the file of this patent:

UNITED STATES PATENTS

| Number | Name | Date |
|---|---|---|
| 2,250,694 | Algarsson | July 29, 1941 |
| 2,370,135 | Berliner | Feb. 27, 1945 |

FOREIGN PATENTS

| Number | Country | Date |
|---|---|---|
| 327,958 | Germany | May 10, 1921 |